United States Patent
George et al.

(10) Patent No.: US 9,351,235 B2
(45) Date of Patent: May 24, 2016

(54) APPARATUS, AND ASSOCIATED METHOD, BY WHICH TO SELECT PACKET COMMUNICATION SERVICE PROVIDER AT ELECTRONIC DEVICE

(75) Inventors: Richard John George, Waterloo (CA); Brian Alexander Oliver, Fergus (CA)

(73) Assignee: BlackBerry Limited, Waterloo, Ontario (CA)

( * ) Notice: Subject to any disclaimer, the term of this patent is extended or adjusted under 35 U.S.C. 154(b) by 725 days.

(21) Appl. No.: 13/075,415

(22) Filed: Mar. 30, 2011

(65) Prior Publication Data

US 2012/0250609 A1 Oct. 4, 2012

(51) Int. Cl.
*H04W 48/18* (2009.01)
*H04W 48/00* (2009.01)
*H04M 3/42* (2006.01)
*H04M 7/00* (2006.01)
*H04L 29/06* (2006.01)

(52) U.S. Cl.
CPC ........... *H04W 48/17* (2013.01); *H04L 65/1046* (2013.01); *H04L 65/1069* (2013.01); *H04L 65/80* (2013.01); *H04M 3/42289* (2013.01); *H04M 7/006* (2013.01)

(58) Field of Classification Search
USPC .......................................... 370/328, 310, 352
See application file for complete search history.

(56) References Cited

U.S. PATENT DOCUMENTS

| | | | |
|---|---|---|---|
| 2007/0004411 A1* | 1/2007 | Goldman et al. | 455/436 |
| 2010/0069099 A1* | 3/2010 | Dunn et al. | 455/466 |
| 2010/0130177 A1* | 5/2010 | Ku et al. | 455/414.1 |
| 2011/0261809 A1* | 10/2011 | den Hartog | 370/352 |

FOREIGN PATENT DOCUMENTS

| | | |
|---|---|---|
| EP | 1858202 A2 | 11/2007 |
| WO | 2008/020943 A1 | 2/2008 |
| WO | 2008/045618 A1 | 4/2008 |
| WO | 2010/069343 A1 | 6/2010 |

OTHER PUBLICATIONS

Canadian Office Action dated Feb. 17, 2015, received for Canadian Application No. 2,772,924.

* cited by examiner

*Primary Examiner* — Dang Ton
*Assistant Examiner* — Pamit Kaur
(74) *Attorney, Agent, or Firm* — Thomas Grzesik; Fleit Gibbons Gutman Bongini & Bianco P.L.

(57) ABSTRACT

An apparatus, and an associated method, permits a user to select a VoIP, or other packet-communication, service provider to be used pursuant to VoIP, or other packet-communication, services. Selection is made at a wireless device. The selection is communicated to a network entity, and the network entity integrates operations such that subsequent services are provided by way of the selected service provider.

19 Claims, 3 Drawing Sheets

APPARATUS, AND ASSOCIATED METHOD, BY WHICH TO SELECT PACKET COMMUNICATION SERVICE PROVIDER AT ELECTRONIC DEVICE

The present disclosure relates generally to a manner by which to facilitate selection of a packet-communication service provider, such as a VoIP service provider, to be used by a wireless, or other electronic, device. Particularly, the present disclosure relates to an apparatus, and an associated method, by which to provide for user selection of a packet communication service provider from amongst a set of permitted service providers to be the active service provider pursuant to which to perform the packet-communication service.

Once selection is made, integration with the selected service provider is automatically carried out, and subsequent performance of the communication service is carried out by way of the selected service provider.

BACKGROUND

For many, use of portable, wireless device by which to communicate is a regular aspect of daily life. The wireless devices operable in cellular, and cellular-like, communication systems, for instance, are used to communicate telephonically and, increasingly, to perform data communication services.

The infrastructure of wireless communication networks have been installed throughout significant portions of the populated areas of the world. And, a user of a wireless device, when positioned in communication range of compatible network infrastructure and permitted to be placed in communication connectivity therewith, is able, by way of the wireless device and the network infrastructure, to communicate with a remote device to carry out a communication service.

The network infrastructures of wireless communication systems are connectable to other types of communication systems, such as PSTNs (Public Switched Telephonic Networks). When the remote device is connected to the PSTN, a circuit-switched connection formable between the wireless device and the remote device, thereby to provide for communication between the wireless device and the remote device by way of the circuit-switched connection.

Newer-generation communication systems, and devices operable therein, often times utilize digital communication techniques. Use of digital communication techniques are advantageously utilized to communicate information for the reason that information is generally more efficiently communicated. Redundancies in the information can be removed from the information prior to transmission. And, by more efficiently communicating the information, the bandwidth required of a communication channel to perform the communication is reduced.

Often times, when utilizing a digital communication technique, the digitized information is formatted into packets forming data packets. Data packets can be communicated in discrete intervals or bursts by a sending communication station. When delivered to a receiving communication station, the data packets are collected, and the informational content of the information is obtained. The sending and receiving communication stations form communication endpoints.

Many packet-based communication services have been developed. Amongst the packet-based communication services that are now available, are VoIP, Voice over Internet Protocol, services. A VoIP service provides packet-based telephonic communications of both voice and data. VoIP communications are implementable as end-to-end communication services, that is, services that do not require any intermediary between the communication endpoints to provide any function other than to provide a transport medium upon which define communication channels. VoIP service providers are able to provide VoIP communication services using existing packet-based networks, such as the internet. In contrast to traditional wire line, telephonic service providers, start-up costs associated with a VoIP service provider are, as a result, relatively low. And, partly as a result, there has been a proliferation of VoIP service providers.

The consumer of VoIP services, therefore, typically has a selection of a number of service providers to elect to utilize for the performance of a VoIP communication service.

A VoIP service is implementable at a wireless device. Other packet-based communication services also are implementable at a wireless device. To perform a VoIP communication service, as well as another packet-based communication service, an associated application, associated with the particular service provider, is typically installed at the wireless device.

It is in light of this background information related to packet communication services that the significant improvements of the present disclosure of evolved.

DETAILED DESCRIPTION

Figure 1:
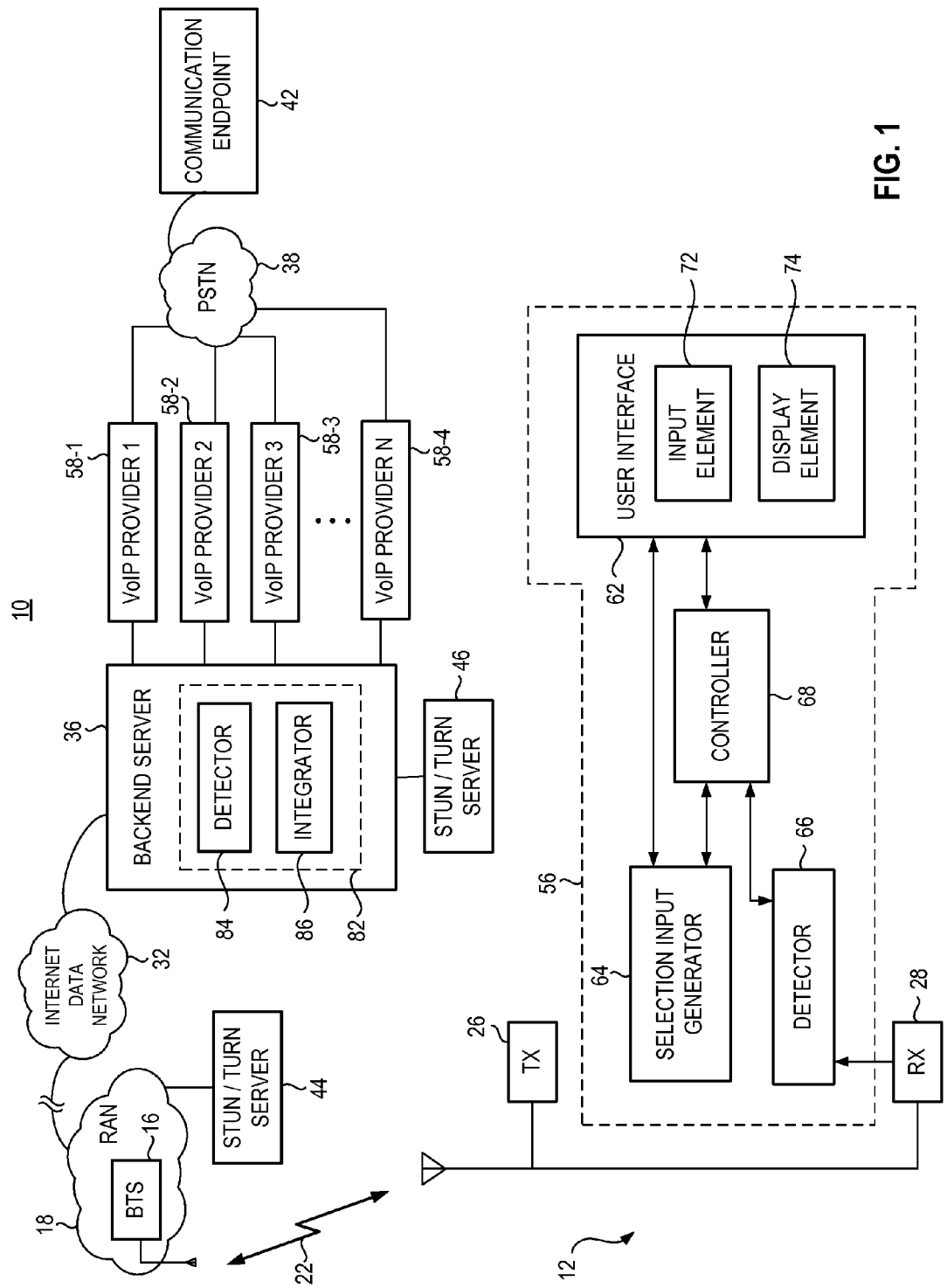
FIG. 1 illustrates a functional block diagram of a communication system that includes an implementation of the present disclosure.

The present disclosure, accordingly, advantageously provides an apparatus, and an associated method, by which to facilitate selection of a packet-communication service provider, such as a VoIP service provider, to be used by a wireless, or other electronic, device.

Through operation of an implementation of the present disclosure, a manner is provided by which to provide for user selection of a service provider from amongst a set of permitted service providers to be the active service provider pursuant to which to perform the packet communication service.

In one aspect of the present disclosure, once selection is made, integration with the selected service provider is automatically carried out, and subsequent performance of the communication service is carried out by way of the selected service provider.

In another aspect of the present disclosure, a wireless device is provided with a selection mechanism, e.g., a new line wizard. A user of the device selects a packet-communication service provider from a list of permitted service providers. And, the user is provided an opportunity to select one or more of the service providers contained in the list. The selected service providers, once selected, define active service providers pursuant to which packet communication services are to be performed. For instance, the listing comprises a listing of VoIP service providers, any of which is selectable to be the active service provider to be used pursuant to VoIP communications.

In another aspect of the present disclosure, the permitted service providers are available depending upon the so-called presence of the device. That is to say, the availability of a service provider, and, e.g., a line provided by the service provider pursuant to a VoIP service, is dependent upon the time of day, the location of the device, or other factor that is determinative of the presence of the device.

In another aspect of the present disclosure, the wireless, or other electronic, device includes applications or other mechanisms associated with the permitted packet-communication service devices. When a service provider is selected, the associated application or other mechanism is utilized pursuant to performance of the communication service.

In another aspect of the present disclosure, the listing of service providers that are displayable and available to be selected to form the active service provider comprises a set of all possible service providers. Or, the listing is comprised of a set of service providers provided by an entity that controls operation of the wireless, or other electronic, device. Or, the set is determined in another manner, such as by a network operator or other entity. By controlling which service providers are available for selection, control is maintained over which service providers are used pursuant to performance of the packet communication service.

In another aspect of the present disclosure, the selection of the one or more service providers to be an active service provider causes the wireless, or other electronic, device to send a message to a remote device, e.g., a server positioned remote from the device. When implemented as a server, the message is routed to the server by way of a communication network, such as a radio access network and the internet or other data network.

In another aspect of the present disclosure, the server, or other device, includes a detector for detecting a message sent thereto that includes identification of the selection of the packet-communication service provider. The messages detected, and the informational content of the message is extracted. The extracted information is provided to an integrator that functions to integrate the wireless, or other electronic, device with the selected service provider, or if more than one, service providers. The integration is carried out, for instance, by use of a standard set of signaling message, e.g., SIP signaling messages, other standard-protocol signaling messages, or proprietary signaling messages. The signaling provided pursuant to the integration by the integrator allows, for instance, the wireless, or other electronic, device to be registered with the selected service provider. When a VoIP service is selected, the registration with the service provider provides for incoming and outgoing calls to be made using the VoIP service of the selected service provider. In one implementation, when a VoIP service is selected, the service also selectably includes mid-call features, such as hold-resume, second incoming and outgoing call, swap and transfer to another number, or other mid-call features. A user is further provided with the opportunity to select such additional mid-call features pursuant to the selection of the service provider.

Further pursuant to integration, the server, or other device, further provides for provisioning and management of the wireless, or other electronic, device. The user of the device is able, thereby, to communicate pursuant to the packet-based communication service using the service provided by the selected service provider.

In these and other aspects, therefore, an apparatus, and an associated method, is provided for an electronic device having packet communication capability. A selector is configured to provide for selection of a packet-communication service provider of a set of permitted packet-communication service provider pursuant to which to perform the packet communication service. A selector is configured to provide for selection of a packet-communication service provider of a set of permitted packet-communication service provider pursuant to which to perform the packet-communication service. A selection indication generator generates a selection indication message indicating selection of the packet-communication service provider of the set provided by the selector to be the active packet-communication service provider. A detector is configured to detect a service-line-related response to the selection indication message.

Turning first, therefore, to FIG. 1, a communication system, shown generally at 10, provides for communications with wireless devices, of which the wireless device 12 is representative. The communication system 10, in the exemplary implementation, comprises a cellular, or cellular-like, communication system operable pursuant to communication protocols defined in an appropriate communication standard. While the following description shall describe operation with respect to the exemplary implementation, in other implementations, the communication system is constructed in other manners. The communication system, for instance, alternately comprises a wire line system, and the device 12, is configured as a wire line device to be operable to communicate in the wire line communication system.

In the exemplary implementation, the wireless device is placed in communication connectivity with a Base Transceiver Station (BTS) 16 of a Radio Access Network (RAN) 18 by way of a communication channel represented by the arrow 22.

The device 12 includes transceiver circuitry, here represented by a transmit (Tx) part 26 and a receive (Rx) part 28. The transmit part functions to transmit signals from the device 12 to the network 18. And, the receive part functions to receive signals transmitted by the network to the device 12.

The device 12 is packet-capable, i.e., the device 12 is capable of participating in, or otherwise being a party to, a packet-based communication service, such as a VoIP service.

The radio access network 18 of the communication system is placed in communication connectivity with a data network, here the internet 32. Devices are connected to the network 32, such as a server 36. And, the data network is placed in communication connectivity with a PSTN (Public Switched Telephonic Network) 38. A telephonic station 42 forming a communication endpoint is placable in communication connectivity with the wireless device 12. STUN/TURN servers 44 and 46 also are connected to the network part of the system 10.

As mentioned previously, wireless, and other electronic, devices, such the device 12, are capable of forming communication endpoints of VoIP communications carried out pursuant to a VoIP communication service. The VoIP communication services are carried out by any of various VoIP service providers. When multiple service providers are simultaneously used by the device 12, there is a possibility that, as a result of a lack of synchronization between the different services, more than one VoIP call, or other packet-communication service, might be attempted during common time periods.

Pursuant to an implementation of the present disclosure, the device 12 further includes an apparatus 56 that facilitates operation of the device pursuant to a VoIP, or other packet-communication, service. The apparatus provides for user selection of any of a plurality of service providers, here, e.g., service providers 58-1, 58-2, 58-3, . . . 58-N that provide the VoIP, or other packet-communication, services. By providing for such selection, a service provider is selected to be an active service provider, and the active service provider is used pursuant to subsequent communications.

The apparatus 56 is functionally represented, formed of functional elements, implementable in any desired manner, including hardware elements, firmware elements, software algorithms executable by processing circuitry, and combinations thereof. The apparatus 56 here includes a user interface 62, a selection indication generator 64, a detector 66, and a controller 68.

The user interface 62 includes an input element 72, here an input keyboard, and a display element 74. In the exemplary implementation, the user interface comprises a touch screen display in which inputs are entered by way of touch inputs upon the user display.

In operation, the controller 68 causes display at the display element of the user interface a listing of permitted service providers, such as the VoIP service providers 58, that are permitted to be selected for use to be an active service provider to be used pursuant to performance of a VoIP, or other packet-communication, service. The service providers contained in the list defines a set of permitted service providers. The entries on the listing, and elements of the set, are, e.g., provided by a network operator in which the wireless device is associated or operable. Alternately, the provided by the provider of the device, is user-configured, or is a listing of all possible service providers.

Howsoever configured, the listing, when caused to be displayed at the display element of the user interface, provides a user of the device 12 with the opportunity to select a service provider from the display listing to be the active service provider pursuant to which a communication service shall be provided. By selecting a service provider from amongst the set of service providers to be the active service provider, the problems conventionally associated with operation of multiple service providers at a common time period is avoided.

When selection is made of a selected service provider through appropriate selection by way of the input element 72 of the user interface 62, the selection indication generator 64 is caused, such as through interaction with the controller 68, to generate a message forming an indication of the selection of the selected provider to be the active service provider. The message is provided to the transmit part 26 and then caused to be transmitted therefrom. The message is sent by way of the radio air interface, the radio access network 18, the data network 32, and is delivered to the server 36.

The server 36 includes further apparatus 82 of an implementation of the present disclosure. The elements of the apparatus 82 are also functionally represented, implementable in any desired manner, including hardware implementations, firmware implementations, software algorithms executable by processing circuitry, and combinations thereof.

The apparatus 82 here includes a detector 84 and an integrator 86. The detector operates to detect the message sent by the device 12 that identifies the selected service provider. Once detection is made by the detector, an indication of the detection and of the selected service provider is provided to the integrator 86. The integrator functions to integrate the device 12 with the selected service provider, here a service provider 58. The integrator 86 is capable of integrating out to various of the service providers 58 using, e.g., signaling of a standard set of signaling, such as SIP (Session Initiation Protocol) signaling, other standard signaling, or proprietary signaling. Signaling is carried out with the selected service provider 58 to register use of the device 12 with the service provider to register the user for the associated service provided by the service provider.

For instance, once selection is made of a VoIP service provider, the integration performed by the integrator 86 through the sending of the signaling messages to the selected service provider permits incoming and outgoing calls to be made to be terminated originated at, respectively, the device 12. If selected, the service further provides, or otherwise makes available, mid-call features, such as hold/resume, second incoming and outgoing call, swap and transfer to another number, or other features.

The integrator 86 of the apparatus 82 further provisions and manages the device 12. Signaling messages are also generated and sent to the device 12, detected at the detector 66 of the apparatus 62. The messages that are generated and communicated provision and manage the wireless device and also allow the provider of the device 12, such as an enterprise, to control who gets which VoIP service.

Once integrated, end-to-end communications are permitted. Information, i.e., media, data forming a voice call or a video call is connected directly between the VoIP service provider and the device endpoint. The transport address of the VoIP service provider and the endpoint is communicated during call set-up signaling. In the exemplary implementation, a standard session description protocol (SDP) module is used. To provide the transport address of the endpoint, the exemplary implementation, the STUN/TURN servers 44 and 46 are utilized. And, in one implementation, encryption is performed using secure RTP (SRTP) or encryption mechanism, to encrypt the media transported between the communication locations. Thereby, problems associated with half hazard use of multiple VoIP, or other packet-communication, service providers and problems resulting therefrom is avoided.

Figure 2:
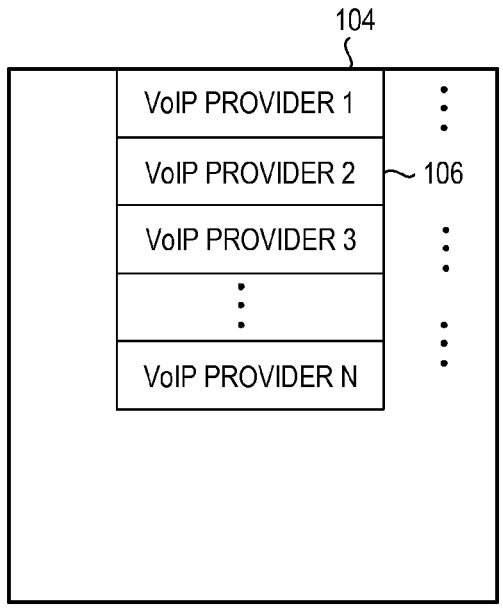
FIG. 2 illustrates an exemplary display generated pursuant to operation of an implementation of the present disclosure.

FIG. 2 illustrates a representation 102 of an exemplary listing displayed at the display element 72 of the user interface 62. In this implementation, the user interface forms a touch-screen in which inputs are entered by touch-input upon the display screen. The representation 102 shows a listing 104 of VoIP service providers with different service providers identified in entries 104 of a menu display. The menu is displayed, for instance, as part of a so-called, new-line wizard that facilitates user selection of the selected service provider. The list, as noted previously, is of permitted service providers, permitted, e.g., by the supplier of the wireless device, a network operator, or configured to identify all available service providers defined by an availability criteria. A user selects, from amongst the listed service providers, a service provider that forms a selected service provider to be the active service provider pursuant to a service.

When selection is made by a user of the device 12, an input evidencing the selection is entered, here by touching the touch-screen display at a location corresponding to the service provider that is to be selected, thereby to select the service provider. Responsive to the selection, the apparatus 62 and 82, shown in FIG. 1, operate to implement the selection so that subsequent services are provided by the selected service provider.

Figure 3:
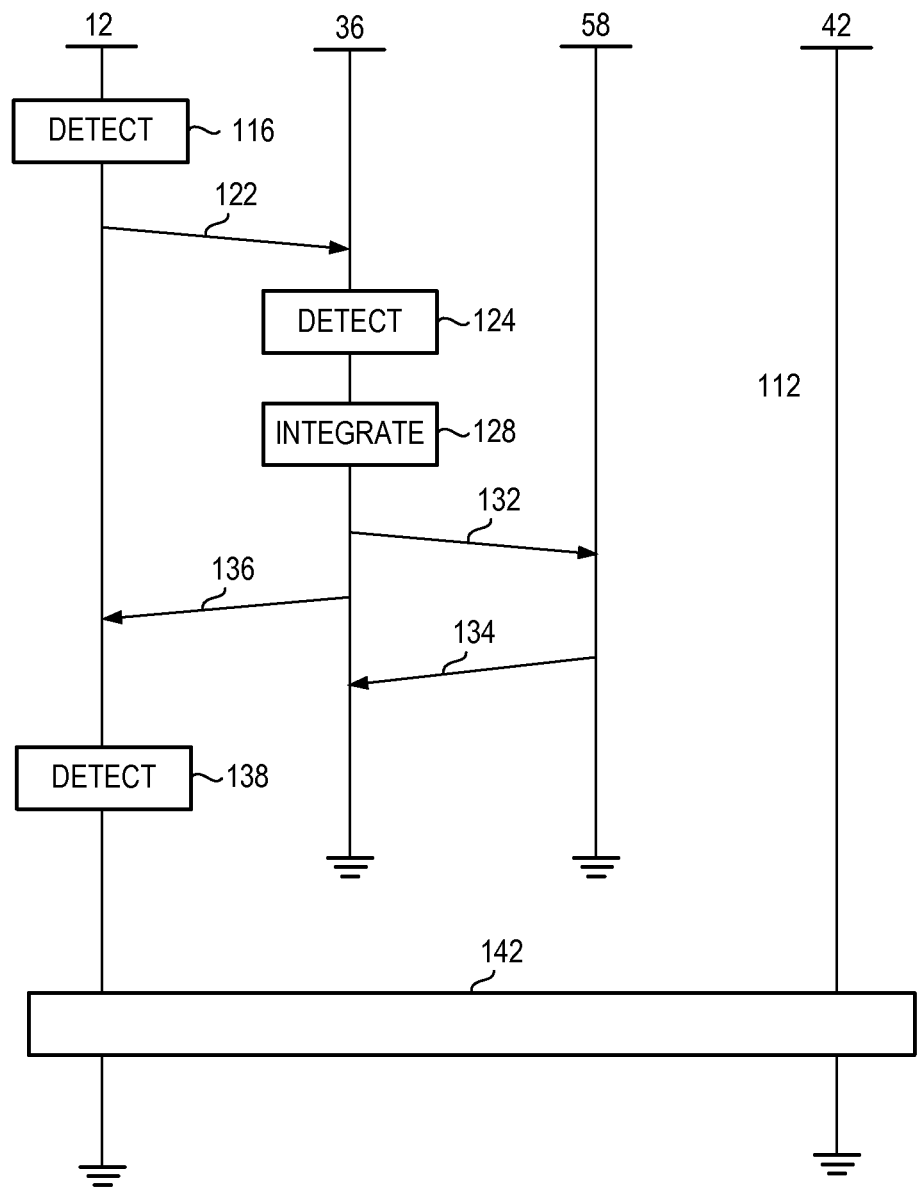
FIG. 3 illustrates a signaling diagram representative of signaling generated during exemplary operation of an implementation of the present disclosure.

FIG. 3 illustrates a message sequence diagram, shown generally at 112, representative of operation of an exemplary implementation of the present disclosure. Here, signaling is represented between a wireless device 12, a back end server 36, a service provider 58, and a communication endpoint 42.

Operation commences at the device 12, when a detection is made, indicated at the block 116, that the selection has been made of a selected service provider. Responsive to the detection, a message is generated and sent, indicated by the segment 122, that is sent on communication channels defined upon a radio air interface, through a network, such as the radio access network and data network 18 and 32, shown in FIG. 1, and delivered to the server 36. The server detects, indicated by the block 124 the delivered message, and, in response, integration, indicated by the block 128 is carried out to cause the selected service provider to be the service provider that provides the VoIP or other packet communication service when subsequently utilized. Here, signaling 132, 134, and 136 with the selected service provider 58 and with the device 12 to effectuate the integration. The block 138 represents detection at the device 12 of the message sent by the server 36. Thereafter, and as indicated by the block 142, a VoIP service, or other packet communication service, is carried out with a communication endpoint 42.

Figure 4:
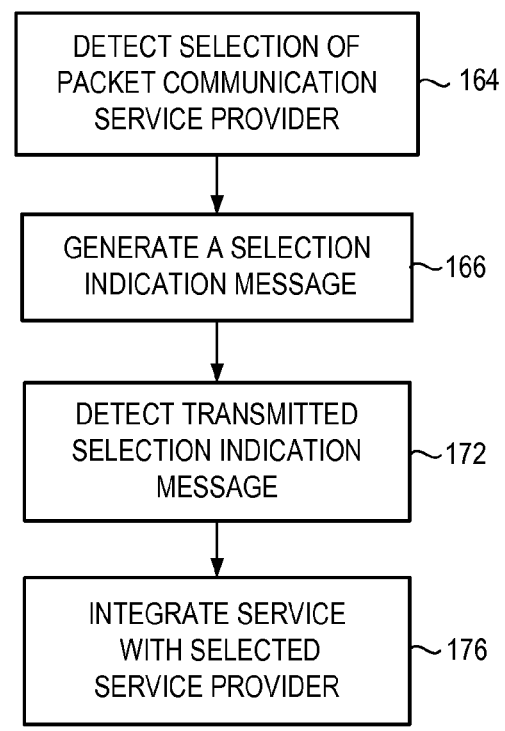
FIG. 4 illustrates a method flow diagram representative of the method of operation of an implementation of the present disclosure.

FIG. 4 illustrates a method flow diagram, shown generally at 162, representative of the method of operation of an implementation of the present disclosure. The method facilitates a packet communication service at an electronic device. First, and as indicated by the block 164, selection of a packet-communication-service provider is detected. The service provider is selected from a set of permitted service providers to be an active service provider pursuant to which to perform a packet-communication service. Then, and as indicated by the block 166, a selection indication message is generated that indicates selection of the service provider to be the active service provider.

Then, subsequent to transmission of the message, the message is detected, indicated by the block 172. And, as indicated by the block 176, integration is provided with the selected service provider to cause selected communications to be performed by way of the selected service provider.

Thereby, a manner is provided by which to permit user selection of a service provider pursuant to which subsequent communication services, such as VoIP services are carried out.

Presently preferred implementations of the disclosure and many improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for an electronic device having packet communication capability, the apparatus comprising:
   a selector comprising a user interface, the user interface being configured to present a set of permitted and available packet-communication service providers to a user of the electronic device, the set of permitted and available packet-communication service providers being defined by a wireless communication network operator providing wireless communication services to the electronic device, wherein each of the set of permitted and available packet-communication service providers is separate and distinct from the wireless communication network operator,
   wherein the selector is configured to provide for selection of one packet-communication service provider from the set of permitted and available packet-communication service providers to be an active packet-communication service provider pursuant to which to perform all packet-communication services, carried out by the electronic device during a time period, wherein each of the set of permitted and available packet-communication service providers is presented in the set of permitted and available packet-communication service providers based on a presence of the electronic device and the presence is dependent on one or more factors including a current time and a current location of the electronic device;
   a selection indication generator configured to generate a selection indication message indicating selection of the one packet-communication service provider of the set provided by the selector to be the active packet-communication service provider during the time period; and
   a detector configured to detect a service-line-related response to the selection indication message.

2. The apparatus of claim 1 wherein the user interface comprises a display screen configured to display the set of permitted and available packet-communication service providers.

3. The apparatus of claim 1 wherein the set of permitted and available packet-communication service providers comprises an electronic-device-supplier-provided set.

4. The apparatus of claim 1 wherein the set of permitted and available packet-communication service providers comprises a system-supported set.

5. The apparatus of claim 1 wherein the selector is configured to provide for selection of one VoIP, Voice over Internet Protocol, service provider of a set of permitted and available VoIP service providers.

6. The apparatus of claim 1 wherein the selection indication generator is configured to generate a wireless-network-optimized signal message, the wireless-network-optimized signal message formed using a wireless-network-optimized signal message formed using a wireless-network-optimized protocol.

7. The apparatus of claim 1 wherein the service-line-related response is formed utilizing a wireless-network-optimized protocol.

8. An apparatus for facilitating a wireless-device packet-communication service, the apparatus comprising:
   a detector configured to detect indication of a selection by a user of a wireless-device of one selected packet-communication service provider, selected from amongst a set of permitted and available packet-communication-service providers defined by a wireless communication network operator providing wireless communication services to the wireless-device pursuant to which to perform all packet communication services during a time period, wherein each of the set of permitted and available packet-communication service providers is made available for selection based on a presence of the wireless-device and the presence is dependent on one or more factors including a current time and a current location of the wireless-device; and
   an integrator configured to provide integration of the wireless-device with the one selected packet-communication-service provider and to cause selected communications to be performed by way of the selected packet-communication service provider during the time period.

9. The apparatus of claim 8 wherein the detector is configured to detect selection by the user of one selected VoIP, Voice over Internet Protocol, service provider.

10. The apparatus of claim 8 wherein the integrator is configured to provide the integration with the selected packet-communication service using signaling of a signaling set.

11. The apparatus of claim 10 wherein the integrator is further configured to cause registration of the wireless-device to the selected wireless-device service.

12. The apparatus of claim 10 wherein the integrator is further configured to provide wireless-device provisioning.

13. The apparatus of claim 10 wherein the integration provides direct wireless-device connection with the selected packet-communication service provider.

14. A method for providing a packet communication service at an electronic device, the method comprising:
- presenting a set of permitted and available packet-communication service providers to a user of the electronic device, wherein each of the set of permitted and available packet-communication service providers is separate and distinct from a wireless communication network operator providing wireless communication services to the electronic device,
- detecting selection of one packet-communication-service provider from the set of permitted and available packet-communication-service providers to be an active packet-communication service provider pursuant to which to perform all packet-communication services carried out by the electronic device during a time period, wherein each of the set of permitted and available packet-communication service providers is presented in the set of permitted and available packet-communication service providers based on a presence of the electronic device and the presence is dependent on one or more factors including a current time and a current location of the electronic device; and
- generating a selection indication message indicating selection of the one packet-communication service provider detected during the detecting to be the active packet-communication service provider during the time period.

15. The method of claim 14 further comprising detecting a service-line-related response to the selection indication message generated during the generating.

16. The method of claim 14 wherein the detecting selection further comprises detecting selection of a select VoIP, Voice over Internet Protocol, service provider.

17. A method for facilitating a wireless-device packet-communication service, the method comprising:
- detecting an indication of selection by a user of a wireless-device of one selected packet-communication service provider from amongst a set of permitted and available packet-communication service providers defined by a wireless communication network operator providing wireless communication services to the wireless-device pursuant to which to perform all packet communication services during a time period, wherein each of the set of permitted and available packet-communication service providers is made available for selection based on a presence of the wireless-device and the presence is dependent on one or more factors including a current time and a current location of the wireless-device device; and
- providing integration of the wireless-device with the selected one packet-communication-service provider to cause selected communications to be performed by way of the selected packet-communication service provider during the time period.

18. The method of claim 17 wherein the providing integration of the wireless-device comprises using signaling of a signaling set.

19. The method of claim 17 wherein the integration of the wireless-device further comprises providing wireless-device provisioning.

* * * * *